United States Patent [19]

Byerly et al.

[11] Patent Number: 5,071,143
[45] Date of Patent: Dec. 10, 1991

[54] SEALING ARRANGEMENT FOR BULKHEAD

[75] Inventors: Robert M. Byerly, Burbank; Bruce S. Fisher, Covina, both of Calif.

[73] Assignee: TA Mfg. Co., Glendale, Calif.

[21] Appl. No.: 376,685

[22] Filed: Jul. 6, 1989

[51] Int. Cl.⁵ .......................... F16J 9/04; H02G 3/18
[52] U.S. Cl. .................... 277/178; 277/199; 174/65 G; 174/152 G; 174/153 G
[58] Field of Search ............ 277/178, 198, 199; 16/2; 174/65 G, 152 G, 153 G; 285/162, 196, 338

[56] References Cited

U.S. PATENT DOCUMENTS

| | | | |
|---|---|---|---|
| 2,367,836 | 1/1945 | Brown | 16/2 |
| 2,518,851 | 8/1950 | Anderson | 16/2 |
| 2,816,950 | 12/1957 | Kruss et al. | 16/2 |
| 3,016,562 | 1/1962 | Reid | 174/153 G |
| 3,901,281 | 8/1975 | Morrisey | 220/414 |
| 3,968,022 | 7/1976 | Eng et al. | 277/125 |
| 4,158,617 | 6/1979 | Eldred | 524/588 |
| 4,280,747 | 7/1981 | Kinzler | 174/153 G |
| 4,487,998 | 12/1984 | Pegram | 174/153 G |
| 4,575,578 | 3/1986 | Bogan et al. | 277/189 |
| 4,630,806 | 12/1986 | Dan et al. | 16/2 |

Primary Examiner—William A. Cuchlinski, Jr.
Assistant Examiner—Daniel G. DePumpo
Attorney, Agent, or Firm—Ellsworth R. Roston; Charles H. Schwartz

[57] ABSTRACT

Apparatus seals holes in an airplane bulkhead and provides for the passage through such holes of members (e.g. electrical wires) furnishing utilities to the airplane. The apparatus includes: 1. A hollow sleeve made from a light, strong and stable material (e.g. titanium) to provide a conduit for the utility members; 2. A relatively hard (e.g. 90 durometer "A") grommet having an internal opening and with an axially extending recess for disposition on the bulkhead with the bulkhead hole in the recess; and 3. A compliant (e.g. 55 durometer "A") gasket with internal opening to receive the sleeve in tight fit relationship. The gasket is provided with first and second portions each having an external periphery with a diameter greater than the diameter of the internal opening in the grommet. The gasket has an external recess axially defined between the first and second portions to receive the grommet at the internal opening in the grommet. The first portion may have voids and an external diameter to provide for a compression to a diameter no greater than that of the external recess. This facilitates the disposition of the grommet on the gasket with the internal opening in the grommet disposed in the external recess in the gasket. The gasket may be cut radially between its external periphery and its internal opening to facilitate the disposition of the gasket on the sleeve. The grommet and the gasket are provided with novel compositions and are made by novel methods.

37 Claims, 2 Drawing Sheets

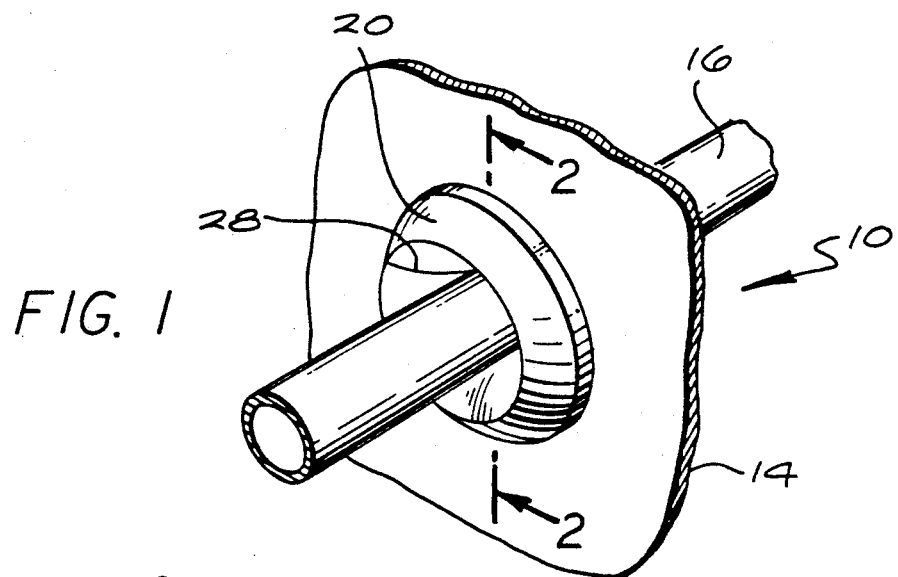
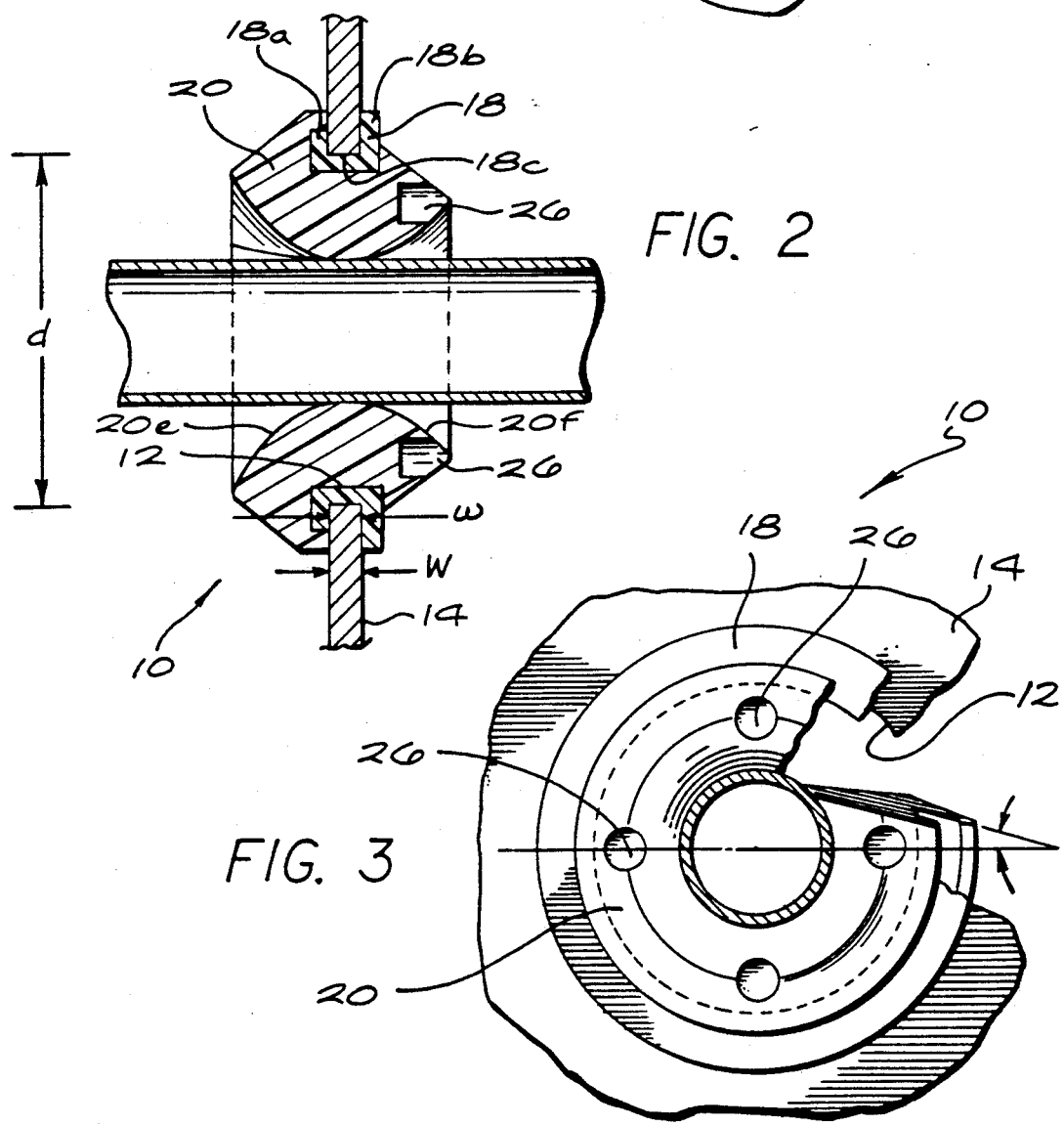

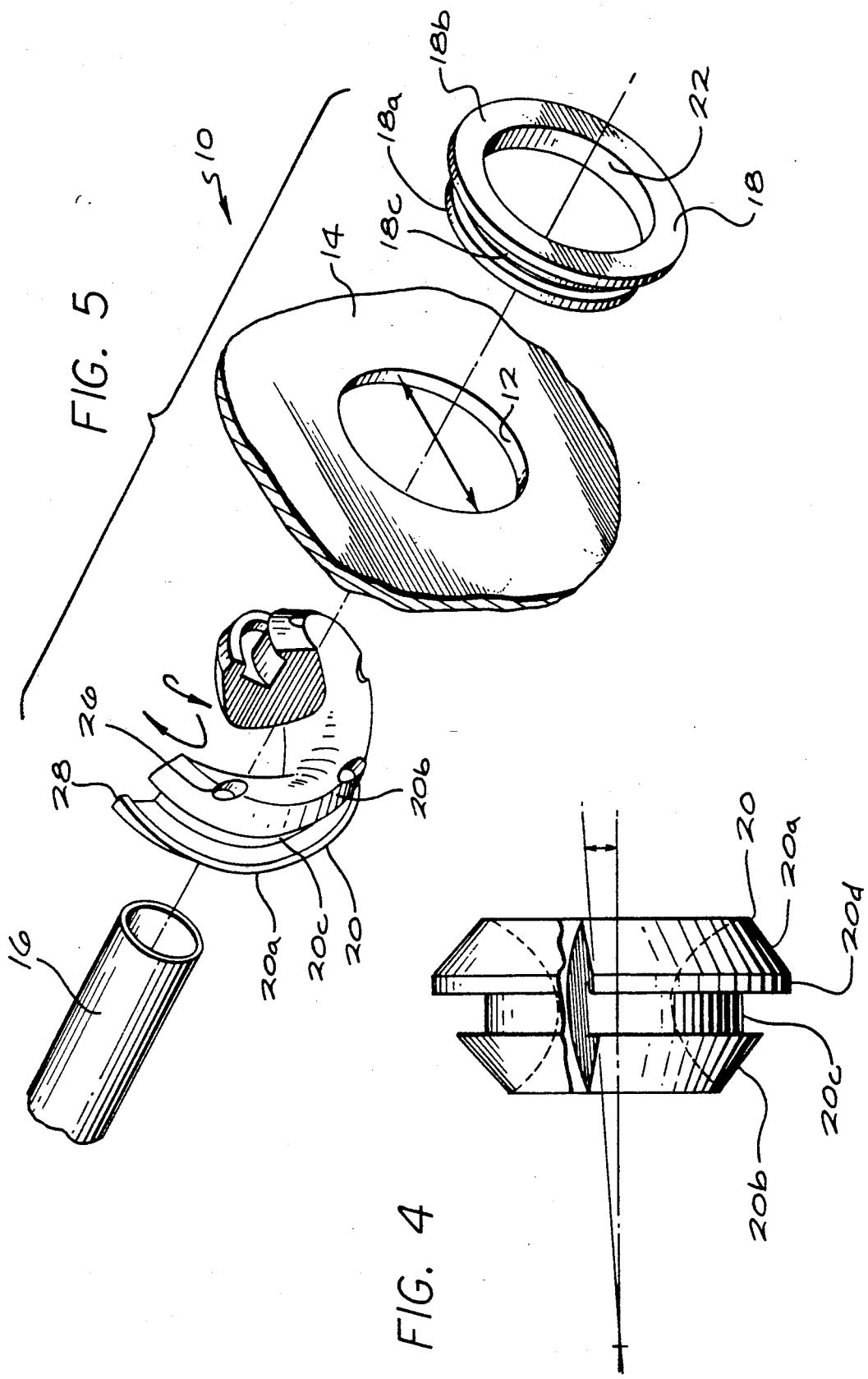

SEALING ARRANGEMENT FOR BULKHEAD

This invention relates to a gasket assembly for use in aircraft. More particularly, the invention relates to a gasket assembly which is easily inserted into a hole in an airplane bulkhead to protect the bulkhead against damage and to provide for the passage of utility members through a sleeve in the gasket assembly. The invention also relates to a novel gasket and to the composition of the gasket and a grommet which cooperates with the gasket to provide the sealing operation.

Bulkheads in airplanes are made from a metal such as aluminum or from a composite material such as a composite material containing carbon and glass fibers. These materials are advantageous because they are light and strong. Holes are sometimes drilled in these bulkheads to provide for the insertion through the holes of members for providing utilities to various parts of the aircraft. For example, the utility members may be electrical wires for providing electrical energy to various components and sub-assemblies of the airplane.

When holes are made in the bulkhead, there is sometimes a tendency for tiny cracks to develop in the bulkhead around the peripheries of the holes. These tiny cracks may tend to propagate if the surface of the bulkhead around the hole is not protected. If cracks develop or propagate, the bulkhead may become weakened, thereby creating some danger that the structural strength of the airplane may be impaired.

The problems of development and propagation of cracks around holes in airplane bulkheads has been recognized for some time. A significant effort has been made, and considerable amounts of money have been expended, to resolve these problems favorably. This has been particularly true in view of the aging of the commercial airplanes now in use and of the tendency of members in the airplane to become weakened as a result of the continued use of the airplane through long years of service. In spite of such significant efforts and considerable expenditures of money, the problems resulting from the generation and propagation of cracks around holes in bulkheads still persist.

This invention provides a gasket assembly which overcomes the problems discussed above. The gasket assembly envelopes the hole and provides a protection of the bulkhead material around the hole to prevent any cracks in the bulkhead around the hole from developing or propagating. The gasket assembly is further advantageous in that it provides for a relatively easy insertion of the gasket assembly on the bulkhead in a proper position around the hole.

In one embodiment, the apparatus of this invention seals holes in an airplane bulkhead and provides for the passage through such holes of members (e.g. electrical wires) furnishing utilities to the airplane. The apparatus includes:

1. A hollow sleeve made from a light, strong and stable material (e.g. titanium) to provide a conduit for the utility members;
2. A relatively hard (e.g. 90 durometer) grommet having an internal opening and an axially extending recess for disposition on the bulkhead with the bulkhead in the recess; and
3. A compliant (e.g. 55 durometer "A") gasket with an internal opening to receive the sleeve in tight fit relationship. The gasket is provided with first and second portions each having an external periphery with a diameter greater than the diameter of the internal opening in the grommet. The gasket has an external recess axially defined between the first and second portions to receive the grommet at the internal opening in the grommet. The first g portion may have voids and an external diameter to provide for a compression to a diameter no greater than that of the external recess. This facilitates the disposition of the grommet on the gasket with the internal opening in the grommet disposed in the external recess in the gasket. The gasket may be cut radially between its external periphery and its internal opening to facilitate the disposition of the gasket on the sleeve.

The grommet and the gasket are provided with novel composition and are made by novel methods.

In the drawings:

FIG. 1 is a front elevational perspective view of a gasket assembly constituting one embodiment of the invention and shows the gasket assembly installed in a hole in a bulkhead to protect the bulkhead in the vicinity of the hole and provide for the passage through the sleeve of utilities such as wires;

FIG. 2 is a cross sectional view taken substantially on the line 2—2 of FIG. 1 and illustrates the construction of the gasket assembly in additional detail;

FIG. 3 is a rear elevational view of the gasket assembly with a portion cut away to show other features in additional detail;

FIG. 4 is a side elevational view of a gasket included in the gasket assembly; and FIG. 5 is an exploded perspective view of the members included in the gasket assembly and of a portion of the bulkhead in which the hole in the bulkhead is provided.

As shown in FIG. 1, a gasket assembly generally indicated at 10 is provided for insertion in a hole 12 in a bulkhead 14 to provide for the passage of a sleeve or conduit 16 through the bulkhead hole. The bulkhead 14 may be made from a suitable material such as aluminum or a composite such as that containing carbon and glass fibers. The sleeve 16 may constitute a conduit for providing for the passage of utility members through the hole 12 from one side of the bulkhead to the other. For example, the utility members may constitute electrical wires which are shielded by the sleeve 16 so that they cannot become frayed. The sleeve 16 may be considered to be included in the gasket assembly 10 and may be formed from a suitable material such as titanium so as to be light, strong and stable.

The gasket assembly 10 includes an annular grommet 18 and a mating annular gasket 20. The grommet member 18 has front and rear flanges 18a and 18b and a recessed annular locking recess 18c between the flanges. The locking recess 18c has an outer diameter d (FIG. 2) approximately equal to the diameter D (FIG. 5) of the hole 12 in the bulkhead 14. An axial length w of the recess 18c corresponds substantially to the thickness of the bulkhead 14. In this way, the grommet 18 can be inserted snugly in the hole 12 in the, bulkhead 14 to protect the material in the bulkhead in the vicinity of the hole 12. The grommet 18 has a hole 22 (FIG. 5).

The gasket 20 has front and rear portions 20a and 20b (FIGS. 4 and 5) and a recess 20c defined between such portions. A flap portion 20d extends rearwardly from the front portion 20a of the gasket 20 to a position against the front wall 18a of the grommet 18 at the radially outer end of the gasket front portion 20. The recess 20c has an axial length and depth to receive the grommet 18 in a locking relationship. The rear portion 20b has a smaller diameter than the front portion 20a. Preferably, the front and rear portions 20a and 20b are respectively provided with conical configurations 20e and 20f progressively tapered with progressive displacements from the recess 20c. The conical configurations 20e and 20f facilitate the movement of the rear portion 20b to a position against the rear flange 18b of the grommet 18 when the gasket is being assembled on the grommet. This movement is facilitated by manually manipulating the front portion 20a of the gasket past the grommet 18 until the grommet is seated properly in the external recess 20c in the gasket 20. However, the front portion 20a may be initially provided with a cylindrical configuration 20d (FIG. 4) at positions adjacent to the recess 20c. The conical configuration 20d defines a flap which abuts the front wall 18a of the grommet 18.

As shown in FIG. 5, voids 26 are disposed in the rear portion 20b of the gasket 20 to provide for the compression of the rear portion 29b to a diameter no greater than that of the recess 20c. In this way, the gasket 20 can be slipped through the hole 22 in the grommet 18 to provide a seal with the grommet against the bulkhead 14. The voids 26 can extend from the rear end of the portion 20b in an axial direction partially through such portion. The gasket 20 can be fashioned with a radial cut 28 (FIG. 5) to enable it it be slipped on the sleeve 16 and still provide a close fit with the sleeve.

The gasket 20 is made from a relatively compliant material such as a material having a durometer "A" hardness of approximately fifty five (55). This provides for the portion 20b of the gasket to be depressed relatively easily so that it can be passed through the hole 22 in the grommet 18. It also allows for the portion 20b of the gasket to return to its original position after the portion 20b has been passed through the hole 22 and the compressive force on such portion has been released. In this way, the grommet 18 is retained on the gasket 20 with the hole 22 in the grommet 18 disposed in the external recess 20c in the gasket 20. The compression of the portion 20b of the gasket 20 is facilitated by the voids 28 in the gasket.

The gasket 20 has been molded from a compound having the following components mixed in the following relative amounts by weight:

| Components | Units By Weight in Compound |
| --- | --- |
| Dow Corning Silastic HS-50 | 75 |
| Dow Corning Silastic LT-50 | 25 |
| Dow Corning Silastic FR-1 | 20 |
| Varox DBPH-50 (catalyst) | 0.72 |

The weight of each of the different components in the gasket 20 may be varied by as much as approximately plus or minus five percent (±5%) without departing from the scope of the invention.

The Silastic HS-50 material is a methyl vinyl polysiloxane compound having high tensile and tear strength and a hardness providing for a durometer "A" of about fifty five (55) for the gasket 20. The Silastic LT-50 matrial is a methyl phenyl polysiloxane. It is desirable because it remains flexible at low temperatures such as are encountered by an airplane on or near the ground or in the upper atmosphere. Such compounds still exhibit good flexibility and resilience at temperatures as low as −65° F. such as occur in unheated portions of an aircraft during flying. The Silastic FR-1 material is added for fire resistance. It is a dispersion of various ingredients, including platinum, in a polysiloxane. The catalyst is Varox DBPH-50, which is sold by the Los Angeles sales office of R.T. Vanderbilt. The catalyst provides for the curing of the mixture of the components included in the gasket 20.

The gasket 20 may be press cured at a pressure of approximately 2000 psi and at a temperature of approximately 340° F. for a period of about 12 minutes. Then it is oven post-cured at a temperature of approximately 450° F. for a period of approximately eight (8) hours without any pressure being applied to the material.

The grommet 18 may be made from a relatively hard material such as a material having a durometer "A" hardness of approximately ninety (90). Because of this, the proper disposition of the gasket 20 relative to the grommet 18 is facilitated because the grommet is retained in position while the portion 20b of the gasket is being inserted through the hole 22 in the grommet. Furthermore, the grommet provides a rigid support for the gasket 20 and the sleeve 16 on the bulkhead 14 after the grommet has been inserted on the gasket and the gasket assembly has been disposed on the bulkhead 14.

The grommet 18 has been molded from a compound having the following components mixed in the following relative parts by weight:

| Components | Units By Weight in Compound |
| --- | --- |
| Dow Corning Silastic HS-70 | 78.45 |
| Dow Corning Silastic LT-50 | 21.55 |
| Cabot Cabosil MS-7 | 17.24 |
| Silastic HA-2 | 1.72 |
| Silastic TM-1 | 0.86 |
| Silastic HT-1 | 0.86 |
| Silcogum Red #8010.29 (Gayson, Inc.) | 1.72 |
| Varox DBPH-50 (catalyst) | 0.69 |

The weight of the different components in the grommet 18 may be varied by as much as approximately plus or minus five percent (±5%) without departing from the scope of the invention.

The silastic HS-70 material is a methyl vinyl polysiloxane compound having high tensile and tear strength. It gives maximum toughness without becoming brittle. It is instrumental in providing a durometer "A" of about ninety (90) for the grommet 18. The Cabosil MS-7 material is an inert filler and is added to provide the grommet 18 with an increased stiffness. The Cabosil MS-7 material constitutes a fumed silica. It will be appreciated that other materials then the Cabosil MS-7 material can be used as an inert filler.

The Silastic HA-2 additive is a mixture of silicone oil and a methyl vinyl polysiloxane. It retards crepe hardening and prevents a crumbling of the material when the fumed silica is added, thereby facilitating processing of the material. The Silastic TM-1 component contains silane, a coupling agent. It promotes an increased tensile strength and facilitates coupling between the silica and the other Silastic materials.

The Silastic HT-1 material is a cesium compound which promotes increased thermal stability. The Silcogum Red #8010.29 material is a mixture of cadmium red pigment (75% by weight) and siloxane gum (25% by weight). It imparts a distinctive red color to the grommet 18. Other pigments may be used instead of, or in addition to, the Silcogum Red material to impart a distinctive color to the grommet 18. A disfersion of red iron oride (75% by weight) in siloxanegum (25% by weight) may be substituted and added with Silastic FR-1 (20% by weight in compound) to impart fire resistance.

The ingredients specified above are mixed at ambient temperatures in a water-cooled two-roll rubber mill in the order specified above. The mixture may be press cured at a pressure of approximately 2000–2500 psi and at a temperature of approximately 340° F. for about twelve (12) minutes. Then it may be oven post-cured at a temperature of approximately 450° F. for about eight (8) hours at standard pressures. The resultant material is strong, will not burn and will not react chemically with the sleeve 16 or with the materials commonly used for the bulkhead 14.

The gasket assembly 10 disclosed above has certain important advantages. It provides the gasket 20 and the grommet 18 with desirable durometers relative to each other to facilitate the disposition of the grommet 18 on the gasket 20 and in proper position relative to the bulkhead 14. It provides the grommet 18 and the gasket 20 with characteristics to be fire resistant and to be chemically inert relative to the materials of the bulkhead 14 and the sleeve 16. It protects the bulkhead 14 from the development or propagation of cracks from the hole 12 in the bulkhead 14.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for sealing a hole in an airplane bulkhead having opposed surfaces and for providing for the passage through the hole in the bulkhead of members for furnishing utility elements to the airplane,
    a sleeve made from a relatively light and strong material and provided with an opening obtaining the passage of the utility elements through the sleeve,
    a grommet made from a relatively hard material and provided with an internal opening the grommet having front and rear walls projecting from the grommet for respectively engaging the opposed surfaces of the bulkhead, the front and rear walls of the grommet defining an external recess to receive the bulkhead at the hole in the bulkhead, and
    a gasket made from a relatively compliant material and provided with an external periphery having dimensions greater than the dimensions of the internal opening in the grommet and provided with front and rear walls defining an external recess to receive the grommet at the internal opening in the grommet and provided with an internal opening to receive the sleeve and constructed to provide for a disposition of the gasket on the sleeve and a disposition of the grommet in the external recess in the gasket, the gasket being provided with a flap extending from the front wall of the gasket to the bulkhead, the flap being disposed against the front wall of the grommet to provide and maintain the disposition of the grommet in the external recess in the gasket, the flap surrounding the outer periphery of the front wall of the grommet.

2. In a combination as set forth in claim 1,
    the gasket being provided with a cut extending from the external periphery of the gasket to the internal opening in the gasket to facilitate the disposition of the gasket on the sleeve and being provided with conical configurations in the portion of the gasket between the grommet and the sleeve to facilitate the disposition of the grommet in the external recess in the gasket.

3. In a combination as set forth in claim 1,
    the gasket being provided with voids extending partially through the gasket from the rear wall of the gasket to facilitate the compression of the rear wall of the gasket to external dimensions no greater than the dimensions of the internal opening in the grommet when the grommet is being disposed in the external recess in the gasket.

4. In combination as set forth in claim 3,
    the rear wall of the gasket being provided with a conical configuration in the portion of the gasket between the grommet and the sleeve to facilitate the disposition of the grommet in the external recess in the gasket.

5. In a combination as set forth in claim 3,
    the gasket being provided with a cut extending from the external periphery of the gasket to the internal opening in the gasket to facilitate the disposition of the gasket on the sleeve,
    the sleeve being made from titanium,
    the gasket being provided with a durometer "A" hardness of approximately fifty five (55) and
    the grommet being provided with a durometer "A" hardness of approximately ninety (90),
    the front wall of the gasket being provided with a conical configuration in the portion of the gasket between the grommet and the sleeve to facilitate the disposition of the grommet in the external recess in the gasket.

6. In combination for sealing a hole in an airplane bulkhead having opposed surfaces and for providing for the passage through the hole in the bulkhead of members for furnishing utilities to the airplane,
    a hollow sleeve made from a strong, stable and light material for receiving the members for furnishing utilities,
    a gasket disposed on the hollow sleeve and provided with front and rear external walls to define an external recess of a first particular dimension and provided with compliant characteristics and with external voids at the rear wall of the gasket to obtain a compression of such rear wall to a dimension no greater than the particular dimension, and
    a grommet having an internal hole with a dimension corresponding substantially to the particular dimension and disposed in the external recess of the gasket and provided with an external recess having a dimension corresponding substantially to that of the hole in the bulkhead to receive the bulkhead, the grommet having front and rear walls projecting from the grommet for respectively engaging the opposed surfaces of the bulkhead,
    the front wall of the gasket being provided with a conical configuration in the portion of the front wall between the grommet and the sleeve to facilitate the disposition of the grommet in the external recess in the gasket.

7. In a combination as set forth in claim 6,
    the gasket being provided with an internal hole having a dimension corresponding to the dimension of the sleeve to receive the sleeve and being cut between its external periphery and the internal hole to facilitate the disposition of the sleeve in the internal hole in the gasket and the rear wall of the gasket being provided with a conical configuration in the portion of the rear wall between the grommet and the sleeve to facilitate the disposition grommet in the external recess in the gasket.

8. In a combination as set forth in claim 6,
the gasket being formed from a material having approximately a 55 durometer "A" hardness and the grommet being formed from a material having approximately a 90 durometer "A" hardness.

9. In a combination as set forth in claim 8,
the gasket being provided with an internal hole having a dimension corresponding to the dimension of the sleeve to receive the sleeve and being cut between its external periphery and the internal hole to facilitate the disposition of the sleeve in the hole, and
a flap extending from the forward wall of the gasket to the bulkhead to a position in abutment with the forward wall of the grommet.

10. In a combination as set forth in claim 8,
the sleeve being cylindrical and the hole in the gasket being annular and the external periphery of the gasket being annular and the diameter of the external periphery of the gasket being smaller on the side of the recess with the voids than the diameter of the external periphery of the gasket on the other side of the external recess.

11. In a combination as set forth in claim 10,
the sleeve being made from titanium and the gasket and the grommet being made from a synthetic plastic, and
the rear wall of the gasket being provided with a conical configuration in the portion of the rear wall between the grommet and the sleeve to facilitate the proper disposition of the grommet in the enternal recess in the gasket.

12. In combination for sealing a hole in an airplane bulkhead having opposed surfaces and for providing for the passage through the hole in the bulkhead of members for furnishing utilities to the airplane,
a sleeve made from a light and strong material,
a grommet made from a hard material and provided with an internal opening and with axially spaced walls defining a recess between the walls, the grommet having front and rear walls projecting from the grommet for respectively engaging the opposed surfaces of the bulkhead, and
a gasket made from a compliant material and provided with an internal opening and constructed to provide for an insertion of the sleeve through the internal opening in the gasket and a tight disposition of the gasket on the sleeve,
the gasket being provided with first and second walls having diameters defining a recess between such walls to retain the grommet in the external recess in the gasket,
the gasket being constructed in the second wall to be compressed to an external diameter no greater than the diameter of the external recess in the gasket to facilitate the disposition of the grommet in the external recess in the gasket,
the gasket being provided with a flap extending from the first wall of the gasket to the bulkhead and abutting one of the spaced walls in the grommet to provide for the disposition of the grommet in the external recess of the gasket, the flap surrounding the outer periphery of the front wall of the grommet.

13. In a combination as set forth in claim 12,
the second wall of the gasket being provided with voids spaced from one another and dimensioned to extend at least partially through the second wall of the gasket.

14. In a combination as set forth in claim 13,
the first wall of the gasket having a greater diameter than the second wall of the gasket, and
the first and second walls of the gasket being cut radially between the external periphery of the gasket and the internal opening in the gasket,
the first wall of the gasket being provided with a conical configuration between the grommet and the sleeve to facilitate the positioning of the grommet in the external recess in the gasket.

15. In a combination as set forth in claim 14,
each of the gasket and the grommet being made from a synthetic plastic and the grommet being provided with a durometer "A" hardness of approximately ninety (90) and the gasket being provided with a durometer "A" hardness of approximately fifty five (55).

16. In a combination as set forth in claim 14,
the second wall of the gasket being provided with a conical configuration between the grommet and the sleeve to facilitate the positioning of the grommet in the external recess in the gasket.

17. In a combination as set forth in claim 16,
the grommet being provided with a durometer "A" hardness of approximately ninety (90) and being formed from a synthetic plastic.

18. In a combination as set forth in claim 16,
the gasket and the grommet being made from a synthetic plastic and the grommet being provided with a durometer "A" hardness of approximately ninety (90) and the gasket being provided with a durometer "A" hardness of approximately fifty five (55).

19. In a combination as set forth in claim 16,
the gasket being provided with a durometer "A" hardness of approximately fifty five (55) and being formed from a synthetic plastic.

20. A conduit gasket assembly for insertion in a hole in a bulkhead having opposed surfaces, said conduit gasket assembly comprising:
an annular grommet having front and rear walls and an annular locking recess of outer diameter approximately that of the hole in the bulkhead and an axial width about that of the bulkhead thickness, the front and rear walls of the grommet having outer diameters larger than that of the locking recess, the grommet having front and rear walls projecting from the grommet for respectively engaging the opposed surfaces of the bulkhead,
an annular gasket having front and rear walls between which is an annular locking recess of axial width and depth sufficient to receive the grommet in a locking relationship, and
a flap extending from the front wall of the gasket to the bulkhead in abutting relationship with the front wall of the grommet to provide for a disposition of the grommet in the annular locking recess of the gasket, the flap surrounding the outer periphery of the front wall of the grommet.

21. the conduit gasket assembly of claim 20 wherein the annular gasket is provided with a conical configuration in the portion radially interior to the annular locking recess to facilitate the disposition of the grommet in the annular locking recess of the gasket.

22. The conduit gasket assembly of claim 20 wherein the annular grommet is molded from a synthetic plastic.

23. The conduit gasket assembly of claim 20 wherein the gasket has a plurality of voids on its rear wall whereby it can easily be compressed to provide for the disposition of the grommet in the annular locking recess in the gasket.

24. The conduit gasket assembly of claim 23 wherein the annular gasket is provided with a conical configuration in the portions of the front and rear walls radially interior of the annular locking recess in the gasket to facilitate the disposition of the grommet on the gasket with the grommet disposed in the annular locking recess of the gasket.

25. The conduit gasket assembly of claim 20 wherein the annular gasket is molded from a synthetic.

26. In a combination for sealing a hole in an airplane bulkhead having opposed surfaces and for providing for the passage through the hole in the bulkhead of members for furnishing utilities to the airplane and for cooperating with a grommet having a hole and with a sleeve to provide such a seal, the grommet having first and second walls for respectively engaging the opposed surfaces of the bulkhead, a gasket made from a compliant material and provided with first and second axially spaced walls and with a hole extending axially through the gasket to receive the sleeve and provided with an external recess at an intermediate position along its axial length between the first and second axially spaced walls to receive the grommet with the hole in the grommet disposed in the external recess in the gasket, the second wall of the gasket being provided with an external diameter, and being constructed, to be compressed to an external diameter no greater than the diameter of the external recess in the gasket to provide for the insertion of the grommet in the external recess in the gasket with the hole in the grommet in the external recess in the gasket, a flap extending from the first wall oft he gasket to the bulkhead to abut against the grommet for providing for the disposition of the grommet in the external recess in the gasket, the flap surrounding the outer periphery of the front wall of the grommet.

27. In a combination as set forth in claim 26,
the first wall of the gasket being provided with a conical configuration in the diametrical distance between the external recess and the hole in the gasket to facilitate the disposition of the grommet in the external recess in the gasket.

28. In a combination as set forth in claim 26,
the first and second walls of the gasket being provided with conical configurations in the diametrical distance between the external recess and the hole in the gasket to facilitate the disposition of the grommet in the external recess in the gasket.

29. In a combination as set forth in claim 26,
the gasket being provided with voids in the second wall of the gasket to facilitate the compression of the second wall of the gasket and to facilitate the disposition of the grommet in the external recess in the gasket.

30. In a combination as set forth in claim 29,
the gasket being made from a material having a durometer "A" hardness of approximately fifty five (55).

31. In a combination as set forth in claim 30,
the gasket being made from a synthetic plastic.

32. In a combination for sealing a hole in an airplane bulkhead having opposed surfaces and for providing for the passage through the hole in the bulkhead of members for furnishing utilities to the airplane and for cooperating with a grommet having a hole and with a sleeve to provide such a seal, the grommet having first and second walls for respectively engaging the opposed surfaces of the bulkhead, a gasket made from a compliant material and provided with an internal opening to fit snugly on the sleeve and with a cut extending radially through the gasket from the external periphery of the gasket to the internal opening to facilitate the disposition of the gasket on the sleeve, the gasket being provided with an external recess at an intermediate position along the axial length of the gasket to receive the grommet with the grommet being disposed in the external recess in the gasket and the gasket being provided with first and second axially spaced walls to define the external recess and with a greater external diameter on the first wall of the external recess than on the second wall of the external recess, the second wall of the gasket being constructed to be compressed to an external diameter no greater than the diameter of the external recess in the gasket to facilitate the disposition of the grommet in the external recess in the gasket, the first wall of the gasket being provided with a conical configuration in the diametrical distance between the external recess and the internal opening to facilitate the disposition of the grommet in the external recess in the gasket.

33. In a combination as set forth in claim 32,
the gasket being provided with voids at spaced positions around the external periphery of the gasket on the second wall of the gasket to facilitate the compression of the second wall of the gasket to a diameter no greater than the diameter of the external recess in the gasket, the second wall of the gasket being provided with a conical configuration in the diametrical distance extending partially between the external recess and the internal opening to facilitate the disposition of the grommet in the external recess of the gasket.

34. In a combination as set forth in claim 33,
the first wall of the gasket being provided with a conical configuration between the external recess and the flap.

35. In a combination as set forth in claim 33,
the second wall of the gasket being provided with voids to facilitate the depression of the second wall to a diameter no greater than the diameter of the external recess in the gasket.

36. In a combination as set forth in claim 35,
the voids extending in the axial direction from the second wall of the gasket to a position spaced from the external recess and the voids being spaced around the annular periphery of the second wall of the gasket.

37. In a combination as set forth in claim 36,
the gasket being provided with a durometer "A" hardness of approximately fifty five (55).

* * * * *